United States Patent Office 2,954,722
Patented Oct. 4, 1960

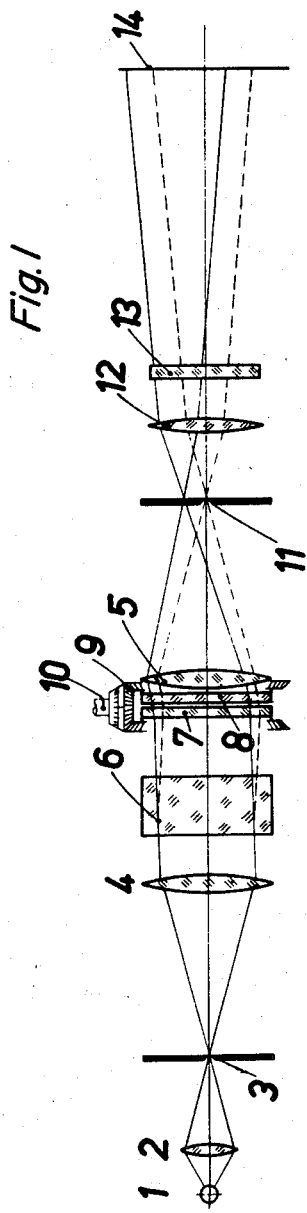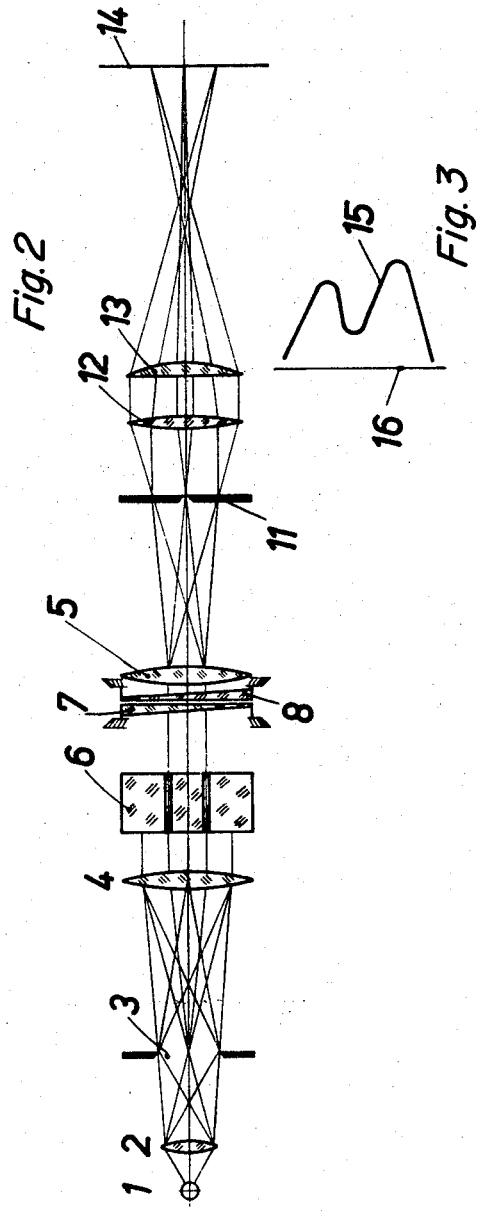

2,954,722

OPTICAL APPARATUS FOR PRODUCING THE CURVE OF THE REFRACTIVE INDEX GRADIENT OF A LIQUID

Horst Lucas, Jena, Germany, assignor to VEB Carl Zeiss Jena, Jena, Germany

Filed Jan. 20, 1958, Ser. No. 717,223

2 Claims. (Cl. 88—14)

This invention relates to an optical apparatus for producing the curve of the refractive index gradient of a liquid on a ground-glass screen by the Philpot-Svensson method for diffusion-sedimentation and electrophoresis investigations, the apparatus containing an illuminated horizontal slit, two lenses, between which the liquid to be examined is contained, an inclined slit, an objective and a cylinder lens having a vertical axis. The undeflected light causes in such an arrangement the appearance on the ground glass plate of a vertical base line. Deflected light produces in this base line sideward deflections constituting the gradient curve.

In the said apparatus the light is generally deflected in only one direction. The lens in the rear of the slit image is not accordingly used in full, and high gradients cannot be embraced. The present invention, which aims at obviating this disadvantage, provides between the object and the lens optical means which deflect the light in such a manner that the lens is fully taken advantage of and can take up high gradients. This light deflection causes the gradient curve to be displaced at right angles to its base line.

Such light deflection can be achieved for instance by a system of glass wedges or under certain circumstances by only one glass wedge. A glass-wedge system of particular advantage is the well-known rotating-wedge compensator for light deflection. This compensator can be disposed in the rear of the cell and equipped with an indicating device showing the ray deflection and the magnitude of the displacement of the gradient curve or a corresponding magnitude.

Figures 1 and 2 of the drawing illustrate diagrammatically, in elevation and ground plan, one example of the optical system of an apparatus according to the invention for electrophoresis investigations. Figure 3 shows the refractive index gradient curve of the liquid to be examined, produced on the ground-glass screen.

The optical system contains a source of light 1 and a condenser 2 for illuminating a horizontal slit 3. 4 and 5 designate lenses, between which a parallel path of rays exists. Between these lenses are disposed on the one hand the cell 6 containing the liquid to be investigated, and on the other hand a rotating wedge compensator, which consists of two wedges 7 and 8 coupled together by means of a bevel gear 9 in such a manner that when a shaft 10 is driven they undergo equal rotations in opposite directions. The said compensator is to permit adjustment of light deflection in only one direction. The shaft 10 is to be conceived as being coupled to an indicator device, which indicates at any given moment the mutual position of the two wedges. 11 indicates an inclined slit, behind which an objective 12 is disposed. Behind this objective is further situated a cylinder lens 13 having a vertical axis in the path of rays. On the ground-glass screen 14 the above described optical system produces a curve 15 of the refractive index gradient in dependence on the height of the liquid to be investigated. By adjusting the rotating wedge compensator 7, 8 by means of the shaft 10, this curve can be displaced at right-angles to its base-line 16.

I claim:

1. An optical apparatus for producing the curve of the refractive-index gradient of a liquid on a ground-glass screen according to the method of Philpot-Svensson, comprising an illuminated horizontal slit, two lenses, a cell containing the liquid to be investigated, said cell being disposed in the parallel ray path between said two lenses, an inclined slit, an objective and a cylinder lens having a vertical axis and disposed in the direction of light in the rear of said two lenses, a base line and the refractive-index gradient corresponding to the height in the liquid in said cell being produced on said ground-glass screen, additional light deflecting means disposed between said cell and the rear lens of said two lenses, said additional means displacing said curve at right angles to said base line.

2. An optical apparatus for producing the curve of the refractive-index gradient of a liquid on a ground-glass screen according to the method of Philpot-Svensson, comprising an illuminated horizontal slit, two lenses, a cell containing the liquid to be investigated, said cell being disposed in the parallel ray path between said two lenses, an inclined slit, an objective and a cylinder lens having a vertical axis and disposed in the direction of light in the rear of said two lenses, a base line and the refractive-index gradient corresponding to the height in the liquid in said cell being produced on said ground-glass screen, a rotating-wedge compensator disposed between said cell and the rear lens of said two lenses, said compensator displacing said curve at right angles to said base line and being connected to an indicating device.

References Cited in the file of this patent

UNITED STATES PATENTS

| 1,760,209 | Pfeiffer | May 27, 1930 |
| 2,268,139 | Hansen | Dec. 30, 1941 |
| 2,780,955 | Wiedemann | Feb. 12, 1957 |

FOREIGN PATENTS

| 394,285 | Great Britain | June 22, 1933 |

OTHER REFERENCES

Jaffe "The Measurement of Refractive Indexes of Liquids in the Infrared," Journal of the Optical Society of America, vol. 41, No. 3, March 1951, pages 166–168.